US009280177B2

(12) United States Patent
Degner et al.

(10) Patent No.: US 9,280,177 B2
(45) Date of Patent: Mar. 8, 2016

(54) PORTABLE COMPUTING DEVICE

(71) Applicant: Apple Inc., Cupertino, CA (US)

(72) Inventors: Brett W. Degner, Menlo Park, CA (US); Christiaan A. Ligtenberg, San Carlos, CA (US); Ron A. Hopkinson, Campbell, CA (US); Bartley K. Andre, Menlo Park, CA (US); Jeremy Bataillou, San Francisco, CA (US); Jay S. Nigen, Mountain View, CA (US); Matthew S. Theobald, San Francisco, CA (US); Matthew P. Casebolt, Fremont, CA (US); Charles A. Schwalbach, Menlo Park, CA (US); Brandon S. Smith, Mountain View, CA (US); William F. Leggett, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/086,353

(22) Filed: Nov. 21, 2013

(65) Prior Publication Data

US 2014/0077670 A1 Mar. 20, 2014

Related U.S. Application Data

(63) Continuation of application No. 13/492,701, filed on Jun. 8, 2012, now Pat. No. 8,616,748.

(51) Int. Cl.
*H05K 5/02* (2006.01)
*G06F 1/16* (2006.01)

(52) U.S. Cl.
CPC ............ *G06F 1/1613* (2013.01); *G06F 1/1616* (2013.01); *G06F 2200/1612* (2013.01); *Y10T 29/49* (2015.01); *Y10T 29/49002* (2015.01)

(58) Field of Classification Search
USPC ................................ 312/223.2, 236; 361/692
See application file for complete search history.

(56) References Cited

U.S. PATENT DOCUMENTS

| 6,219,230 | B1 | 4/2001 | Cho |
| 6,356,440 | B2 | 3/2002 | Selker |
| 7,352,573 | B2 * | 4/2008 | Wong ............................ 361/695 |
| 7,755,891 | B2 | 7/2010 | Homer et al. |
| 7,808,776 | B2 | 10/2010 | Bauer, Jr. et al. |
| 7,843,684 | B2 * | 11/2010 | Lu et al. ................... 361/679.47 |

(Continued)

FOREIGN PATENT DOCUMENTS

| KR | 10-0794355 | 1/2008 |
| WO | 92-011623 | 7/1992 |

OTHER PUBLICATIONS

International Search Report and Written Opinion in PCT Application PCT/US2012/041745, dated Feb. 27, 2013.

(Continued)

*Primary Examiner* — Daniel Rohrhoff
(74) *Attorney, Agent, or Firm* — Downey Brand LLP

(57) ABSTRACT

The present application describes various embodiments regarding systems and methods for providing a lightweight and durable portable computing device having a thin profile. The portable computing device can take the form of a laptop computer. The laptop computer can include a uni-body top case having an integrated support system formed therein, the integrated support system providing structural support that distributes applied loads through the top case preventing warping and bowing.

17 Claims, 16 Drawing Sheets

(56) References Cited

U.S. PATENT DOCUMENTS

| | | |
|---|---|---|
| 7,929,283 B2 | 4/2011 | Wang |
| 2002/0075647 A1* | 6/2002 | DiFonzo et al. ............... 361/687 |
| 2003/0079949 A1 | 5/2003 | Harvey |
| 2004/0037034 A1* | 2/2004 | Suzuki et al. ................. 361/687 |
| 2005/0185376 A1* | 8/2005 | Sawyer .......................... 361/687 |
| 2007/0058346 A1* | 3/2007 | Yeh ................................ 361/697 |
| 2008/0117571 A1 | 5/2008 | Song |
| 2009/0147477 A1* | 6/2009 | Chao et al. .................... 361/697 |
| 2010/0091442 A1* | 4/2010 | Theobald et al. ......... 361/679.09 |
| 2010/0238619 A1* | 9/2010 | Shirasaka ................. 361/679.08 |
| 2010/0246125 A1* | 9/2010 | Okutsu .......................... 361/695 |
| 2011/0090632 A1 | 4/2011 | Raff |
| 2012/0314354 A1* | 12/2012 | Rayner .................... 361/679.01 |

OTHER PUBLICATIONS

Notice of Allowance in U.S. Appl. No. 13/492,701, mailed Aug. 26, 2013.

* cited by examiner

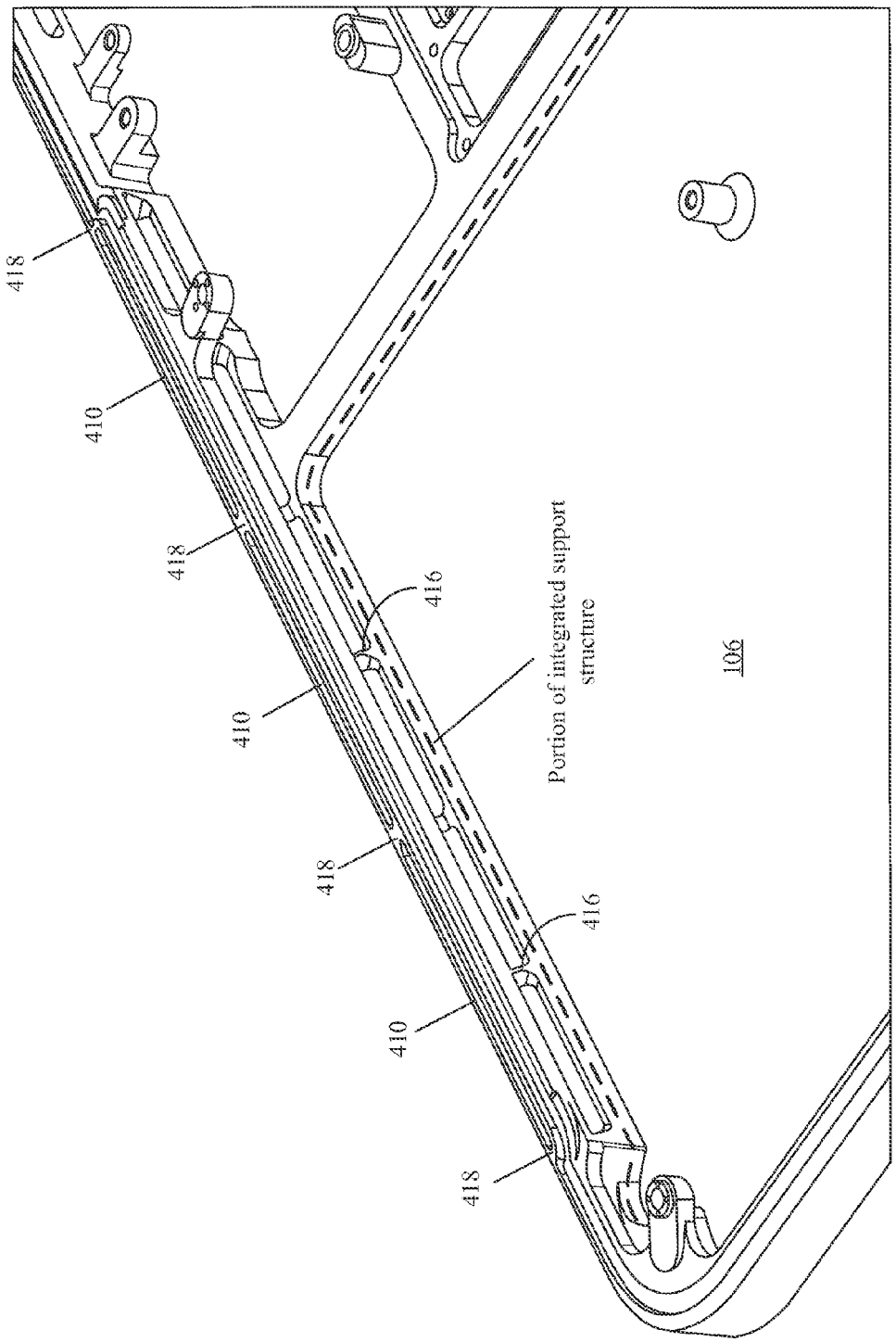

PORTABLE COMPUTING DEVICE

CROSS REFERENCE TO RELATED APPLICATIONS

This U.S. patent application is a continuation of co-pending U.S. patent application Ser. No. 13/492,701, filed Jun. 8, 2012 entitled "PORTABLE COMPUTING DEVICE", the disclosure of which is incorporated by reference in its entirety for all purposes.

TECHNICAL FIELD

The embodiments described herein relate generally to portable computing devices. More particularly, the present embodiments relate to structures and fabrication of enclosures suitable for portable computing devices.

BACKGROUND

The outward appearance of a portable computing device, including its design and its heft, is important to a user of the portable computing device, as the outward appearance contributes to the overall impression that the user has of the portable computing device. At the same time, the assembly of the portable computing device is also important to the user, as a durable assembly will help extend the overall life of the portable computing device and will increase its value to the user.

One design challenge associated with the manufacture of portable computing devices is the design of the outer enclosures used to house the various internal components. This design challenge generally arises from a number conflicting design goals that include the desirability of making the outer enclosure or housing lighter and thinner, of making the enclosure stronger, and of making the enclosure aesthetically pleasing, among other possible goals. Lighter housings or enclosures tend to be more flexible and therefore have a greater propensity to buckle and bow, while stronger and more rigid enclosures tend to be thicker and carry more weight. Unfortunately, the increased weight of thicker enclosures may lead to user dissatisfaction with respect to clunkiness or reduced portability, whereas thinner enclosures can be prone to bowing that may damage internal parts or lead to other failures. Furthermore, the overall appearance of the portable computing device must be aesthetically pleasing as few consumers desire to own or use a device that is perceived to be ugly or unsightly. Due to such considerations, portable computing device enclosure materials are typically selected to provide sufficient structural rigidity while also meeting weight constraints, with any aesthetic appeal being worked into materials that meet these criteria.

As such, outer enclosures or housings for portable computing devices are often made from aluminum, steel and other inexpensive yet sturdy metals having a suitable thickness to achieve both goals of low weight and high structural rigidity. The use of metal enclosures is also convenient from the standpoint of providing a ready electrical ground and/or a ready radio frequency ("RF") or electromagnetic interference ("EMI") shield for the processor and other electrical components of the computing device, since a metal enclosure or outer housing can readily be used for such functions.

Therefore, it would be beneficial to provide portable computing device that is aesthetically pleasing and lightweight as well as durable.

SUMMARY

The present application describes various embodiments regarding systems and methods for providing a lightweight and durable portable computing device having a thin profile. This can be accomplished at least in part through the use of a multi-part housing described herein.

In one embodiment, a portable computing device is described. The portable computing device includes at least a bottom case and a top case coupled to the bottom case to form a multi-part housing for at least a portion of the portable computing device. The multi-part housing encloses at least a plurality of operational components and includes an integrated support system. The integrated support system is configured to distribute an externally applied load through the complete housing and provide structural elements for attaching selected operational components to the top case.

The multi-part housing can be formed of a strong and resilient material such as aluminum that can be surface treated (anodize) to provide an aesthetically pleasing appearance. The bottom case and the top case are joined using fasteners. In one embodiment, the top case is a uni-body top case formed from a single billet of aluminum that is machined into a desired shape and size.

The top case includes the integrated support system. The integrated support system adds to the structural integrity of the top case. The integrated support system is continuous in nature in that there are no gaps or breaks. The integrated support system includes a number of support structures that can be used to provide support for individual components (such as a keyboard). For example, the integrated support system includes a keyboard support rib that can be used as a reference datum. The keyboard support rib can also provide additional structural support due to the added thickness of the keyboard support. The keyboard support rib can also be used as part of a shield that helps to prevent light leaking from a keyboard assembly as well as part of a Faraday cage that prevents leakage of electromagnetic radiation.

In another embodiment, a method of forming a top case for a portable computing device is described. The method is performed by performing at least the following operations. Forming a single piece seamless housing having a bottom opening. In the described embodiment, the single piece seamless housing has an integral top and side walls that cooperate to form a cavity in cooperation with the bottom opening. The single piece seamless housing also includes a downward sloping edge of the side walls surrounding and defining the front opening. A keyboard opening in the top wall having a size and shape in accordance with a keyboard assembly is formed. An integrated support system is formed in the single piece seamless housing. The integrated support system includes at least a keyboard support rib surrounding and defining the keyboard opening.

In some embodiments, a plurality of side vents are formed at the downward sloping edge and a plurality of rear vents are formed at at a side wall at a rear portion of the single piece seamless housing. The plurality of rear vents and the plurality of side vents cooperate to facilitate passage of air between the cavity and an external environment.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and arrangements for the disclosed inventive apparatuses and methods for providing portable computing devices. These drawings in no way limit any changes in form and detail that may be made to the invention by one skilled in the art without departing from the spirit and scope of the invention. The embodiments will be readily understood by the following detailed description in conjunction with the accompanying drawings, wherein like reference numerals designate like structural elements.

FIG. 6A show various embodiments of the integrated vent system of FIG. 5.

DETAILED DESCRIPTION

Figure 1:
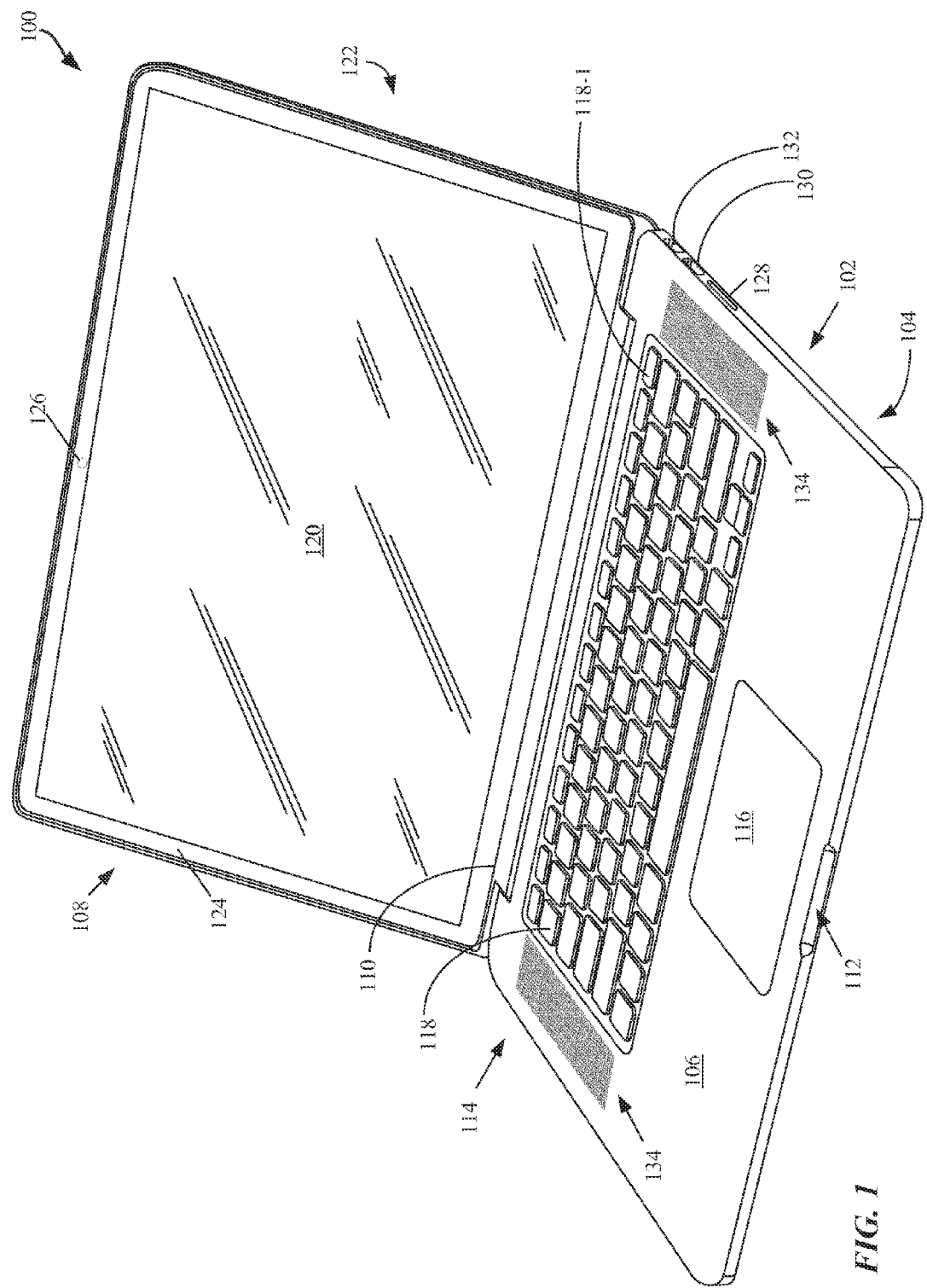
FIG. 1 shows a front facing perspective view of an embodiment of the portable computing device in the form of portable computing device in an open (lid) state.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The following relates to a portable computing device such as a laptop computer, net book computer, tablet computer, etc. The portable computing device can include a multi-part housing having a top case and a bottom case joining at a reveal to form a base portion. The portable computing device can have an upper portion (or lid) that can house a display screen and other related components whereas the base portion can house various processors, drives, ports, battery, keyboard, touchpad and the like. The top case and the bottom case can each be joined in a particular manner at an interface region such that the gap and offset between top and bottom cases are not only reduced, but are also more consistent from device to device during the mass production of devices. These general subjects are set forth in greater detail below.

In a particular embodiment, the lid and base portion can be pivotally connected with each other by way of what can be referred to as a clutch assembly. The clutch assembly can be arranged to pivotally couple the base portion to the lid. The clutch assembly can include at least a cylindrical portion that in turn includes an annular outer region, and a central bore region surrounded by the annular outer region, the central bore suitably arranged to provide support for electrical conductors between the base portion and electrical components in the lid. The clutch assembly can also include a plurality of fastening regions that couple the clutch to the base portion and the lid of the portable computing device with at least one of the fastening regions being integrally formed with the cylindrical portion such that space, size and part count are minimized.

The multipart housing can be formed of a strong and durable yet lightweight material. Such materials can include composite materials and or metals such as aluminum. Aluminum has a number of characteristics that make it a good choice for the multipart housing. For example, aluminum is a good electrical conductor that can provide good electrical ground and it can be easily machined and has well known metallurgical characteristics. The superior conductivity of aluminum provides a good chassis ground for internal electrical components arranged to fit and operate within the housing. The aluminum housing also provides a good electromagnetic interference (EMI) shield protecting sensitive electronic components from external electromagnetic radiation as well as reducing electromagnetic radiation emanating from the portable computing device.

In the embodiments where at least one of the top case and bottom case are formed of conductive material, such as aluminum, a good electrical ground plane or electrical ground can be provided. The ability to provide a good ground plane can be particularly advantageous due to the close proximity of the operational components to one another in the portable computing device. Due to this close proximity, it is desirable to isolate sources of significant RF radiation (such as a main logic board, or MLB) from those circuits, such as wireless circuits, that are sensitive to RF interference. In this way, at least the conductive top and/or bottom case be used to provide a good chassis ground that, in turn, can be used to electromagnetically isolate the circuits that produce RF energy from those components that are sensitive to RF energy. Moreover, by forming both top and bottom case with conductive material, the top and bottom case can be joined to form the base portion that can act as a Faraday cage that can effectively shield the external environment from EMI generated by the portable computing device. The Faraday cage like attributes of the base portion can also protect RF sensitive components from externally generated EMI.

In order to both protect the multipart housing and provide an aesthetically appealing finish (both visual and tactile), a protective layer can be placed or formed on an external surface of the multipart housing. The protective layer can be applied in such a way to both enhance the aesthetic appeal of the housing and to protect the appearance of the portable computing device. In one embodiment, when the multipart housing is formed of aluminum, at least an exterior surface of the aluminum can be anodized to form the protective layer.

The top case can include a cavity, or lumen, into which a plurality of operational components can be inserted during an assembly operation. In the described embodiment, the operational components can inserted into the lumen and attached to the top case in an "top-bottom" assembly operation in which top most components are inserted first followed by components in a top down arrangement. For example, the top case can be provided and shaped to accommodate a keyboard module. The keyboard module can include a keyboard assembly formed of a plurality of keycap assemblies and associated circuitry, such as a flexible membrane on which can be incorporated a switching matrix and protective feature plate. Therefore, following the top-bottom assembly approach, the keyboard assembly is first inserted into the top case followed by the flexible membrane and then the feature plate that is attached to the top case. Other internal components can then be inserted in a top to bottom (when viewed from the perspective of the finished product) manner.

In one embodiment, the keyboard module can be configured in such a way that a keycap assembly can be used to replace a power switch. For example, in a conventional keyboard each of a top row of keycaps can be assigned at least one function. However, by re-deploying one of the keycaps as a power button, the number of operational components can be reduced by at least eliminating the switch mechanism associated with the conventional power button and replacing it with the already available keycap assembly and associated circuitry.

In addition to the keyboard, the portable computing device can include a touch sensitive device along the lines of a touch pad, touch screen, etc. In those embodiments where the portable computing device includes a touch pad the touch pad can be formed from a glass material. The glass material provides a cosmetic surface and is the primary source of structural rigidity for the touchpad. The use of the glass material in this way significantly reduces the overall thickness of the touchpad compared to previous designs. The touchpad can include circuitry for processing signals from a sensor associated with the touchpad. In one embodiment, the circuitry can be embodied as a printed circuit board (PCB). The PCB can be formed of material and placed in such a way that provides structural support for the touchpad. Thus, a separate touchpad support is eliminated.

Due at least to the strong and resilient nature of the material used to form the multipart housing; the multipart housing can include a number of openings having wide spans that do not require additional support structures. Such openings can take the form of ports that can be used to provide access to internal circuits. The ports can include, for example, data ports suitable for accommodating data cables configured for connecting external circuits. The openings can also provide access to an audio circuit, video display circuit, power input, etc.

In one embodiment, the top case can be formed from a single billet of aluminum that is machined into a desired shape and size. The top case can include an integrated support system that adds to the structural integrity of the top case. The integrated support system can be continuous in nature in that there are no gaps or breaks. The integrated support system can be used to provide support for individual components (such as a keyboard). For example, the integrated support system can take the form of ribs that can be used as a reference datum for a keyboard. The ribs can also provide additional structural support due to the added thickness of the ribs. The ribs can also be used as part of a shield that help to prevent light leaking from the keyboard as well as act as a Faraday cage that prevents leakage of extraneous electromagnetic radiation.

The top case can also include multi-function features that can provide more than one function. For example, vents can be provided on selected sides of the top case. The vents can be shaped to provide a conduit for air flow that can be used to cool internal components such as a CPU or GPU. The vents can also be sized to further limit the transmission of RF energy in the form of EMI from internal components. The vents can also be used to provide additional structural support as well as optionally porting audio from nearby audio components.

The continuous nature of the integrated support system can result in a more even distribution of an external load applied to the multi-part housing resulting in a reduced likelihood of warping, or bowing that reduces risk to internal components. The integrated support system can also provide mounting structures for those internal components mounted to the multi-part housing. Such internal components include a mass storage device (that can take the form of a hard disk drive, HDD, or solid state drive, SSD), audio components (audio jack, microphone, speakers, etc.) as well as input/output devices such as a keyboard and touch pad.

These and other embodiments are discussed below with reference to FIGS. 1-13. However, those skilled in the art will readily appreciate that the detailed description given herein with respect to these figures is for explanatory purposes as the invention extends beyond these limited embodiments.

FIGS. 1-13 show various views of the portable computing device in accordance with various embodiments. FIG. 1 shows a front facing perspective view of an embodiment of the portable computing device in the form of portable computing device 100 in an open (lid) state. Portable computing device 100 can include base portion 102 formed of bottom case 104 fastened to top case 106. Base portion 102 can be pivotally connected to lid portion 108 by way of clutch assembly 110 hidden from view by a cosmetic wall. Base portion 102 can have an overall uniform shape sized to accommodate clutch assembly 110 and inset portion 112 suitable for assisting a user in lifting lid portion 108 by, for example, a finger. Top case 106 can be configured to accommodate various user input devices such as keyboard 114 and touchpad 116. Keyboard 114 can include a plurality of low profile keycap assemblies each having an associated key pad 118. In one embodiment, an audio transducer (not shown) can use selected portions of keyboard 114 to output audio signals such as music. In the described embodiment, a microphone can be located at a side portion of top case 106 that can be spaced apart to improve frequency response of an associated audio circuit.

Each of the plurality of key pads 118 can have a symbol imprinted thereon for identifying the key input associated with the particular key pad. Keyboard 114 can be arranged to receive a discrete input at each keypad using a finger motion referred to as a keystroke. In the described embodiment, the symbols on each key pad can be laser etched thereby creating an extremely clean and durable imprint that will not fade under the constant application of keystrokes over the life of portable computing device 100. In order to reduce component count, a keycap assembly can be re-provisioned as a power button. For example, key pad 118-1 can be used as power button 118-1. In this way, the overall number of components in portable computing device 100 can be commensurably reduced.

Touch pad 116 can be configured to receive finger gesturing. A finger gesture can include touch events from more than one finger applied in unison. The gesture can also include a single finger touch event such as a swipe or a tap. The gesture can be sensed by a sensing circuit in touch pad 116 and converted to electrical signals that are passed to a processing unit for evaluation. In this way, portable computing device 100 can be at least partially controlled by touch.

Lid portion 108 can be moved with the aid of clutch assembly 110 from the closed position to remain in the open position and back again. Lid portion 108 can include display 120 and rear cover 122 (shown more clearly in FIG. 2) that can add a cosmetic finish to lid portion 108 and also provide structural support to at least display 120. In the described embodiment, lid portion 108 can include mask (also referred to as display trim) 124 that surrounds display 120. Display trim 124 can be formed of an opaque material such as ink deposited on top of or within a protective layer of display 120. Display trim 124 can enhance the overall appearance of display 120 by hiding operational and structural components as well as focusing attention onto the active area of display 120.

Display 120 can display visual content such as a graphical user interface, still images such as photos as well as video media items such as movies. Display 120 can display images using any appropriate technology such as a liquid crystal display (LCD), OLED, etc. Portable computing device 100 can also include image capture device 126 located on a transparent portion of display trim 124. Image capture device 126 can be configured to capture both still and video images. Lid portion 108 can be formed to have uni-body construction that can provide additional strength and resiliency to lid portion 108 which is particularly important due to the stresses caused by repeated opening and closing. In addition to the increase in strength and resiliency, the uni-body construction of lid portion 108 can reduce overall part count by eliminating separate support features.

Data ports 128-132 can be used to transfer data and/or power between an external circuit(s) and portable computing device 100. Data ports 128-132 can include, for example, input slot 128 that can be used to accept a memory card (such as a FLASH memory card), data ports 130 and 132 can take be used to accommodate data connections such as USB, FireWire, Thunderbolt, and so on. In some embodiments, speaker grid 134 can be used to port audio from an associated audio component enclosed within base portion 102.

Figure 2:
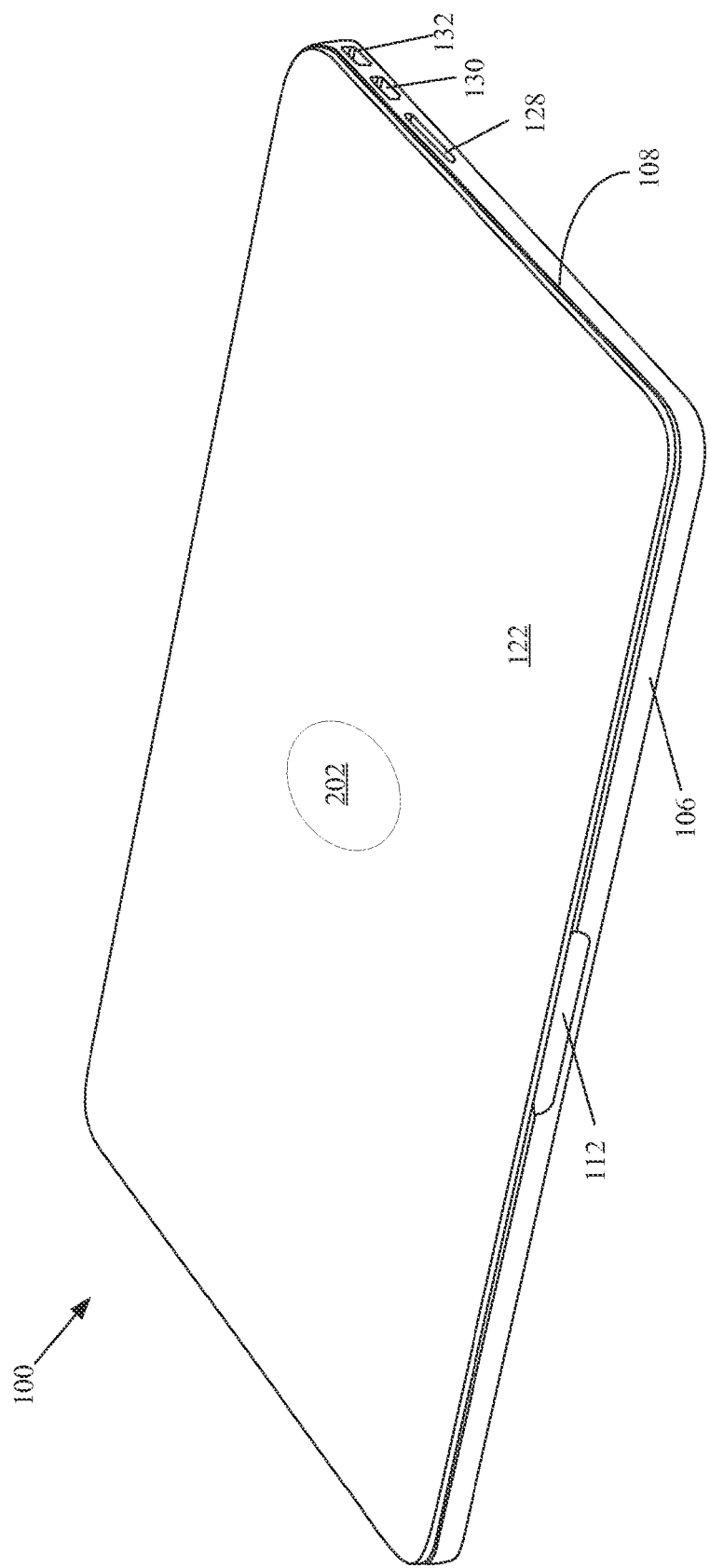
FIG. 2 shows portable computing device in a closed (lid) configuration that shows rear cover and logo.

FIG. 2 shows portable computing device 100 in a closed (lid) configuration that shows rear cover 122 and logo 202. In one embodiment, logo 202 can be illuminated by light from display 120. It should be noted that in the closed configuration, lid portion 108 and base portion 102 form what appears to be a uniform structure having a continuously varying and coherent shape that enhances both the look and feel of portable computing device 100.

Figure 3:
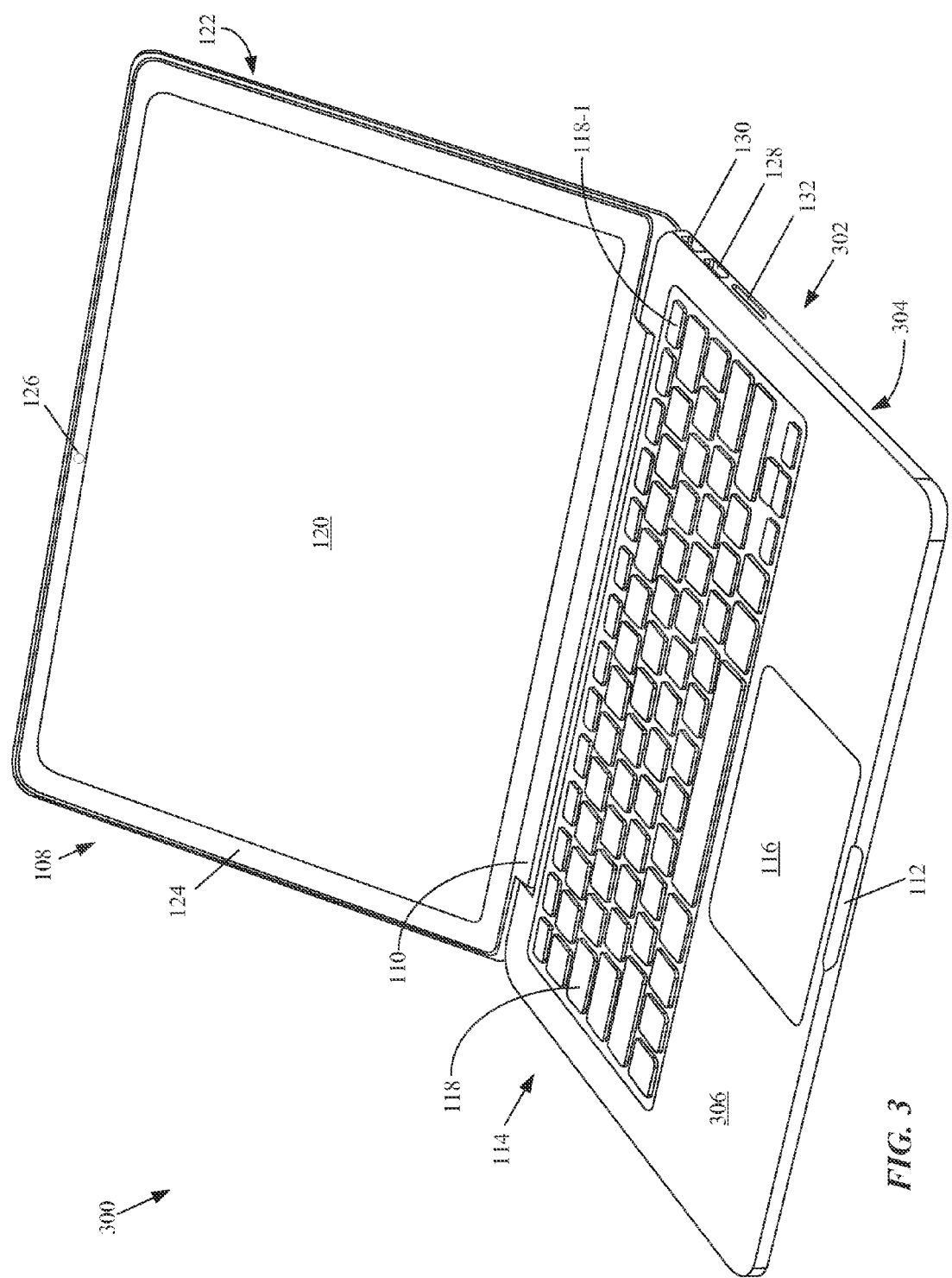
FIG. 3 shows another embodiment of the portable computing device in an open state.

FIG. 3 shows another embodiment in the form of portable computing device 300 that is smaller than portable computing device 100. Since portable computing device 300 is smaller in size than portable computing device 100, certain features shown in FIG. 1 are modified, or in some cases lacking, in portable computing device 300. For example, base portion 302 can be reduced in size such that separate speakers (such as speaker grid 134) are replaced with an audio port embodied as part of keyboard 114. However, bottom case 304 and top case 306 can retain many of the features described with regards to portable computing device 100 (such as display 120 though reduced to an appropriate size).

Figure 4:
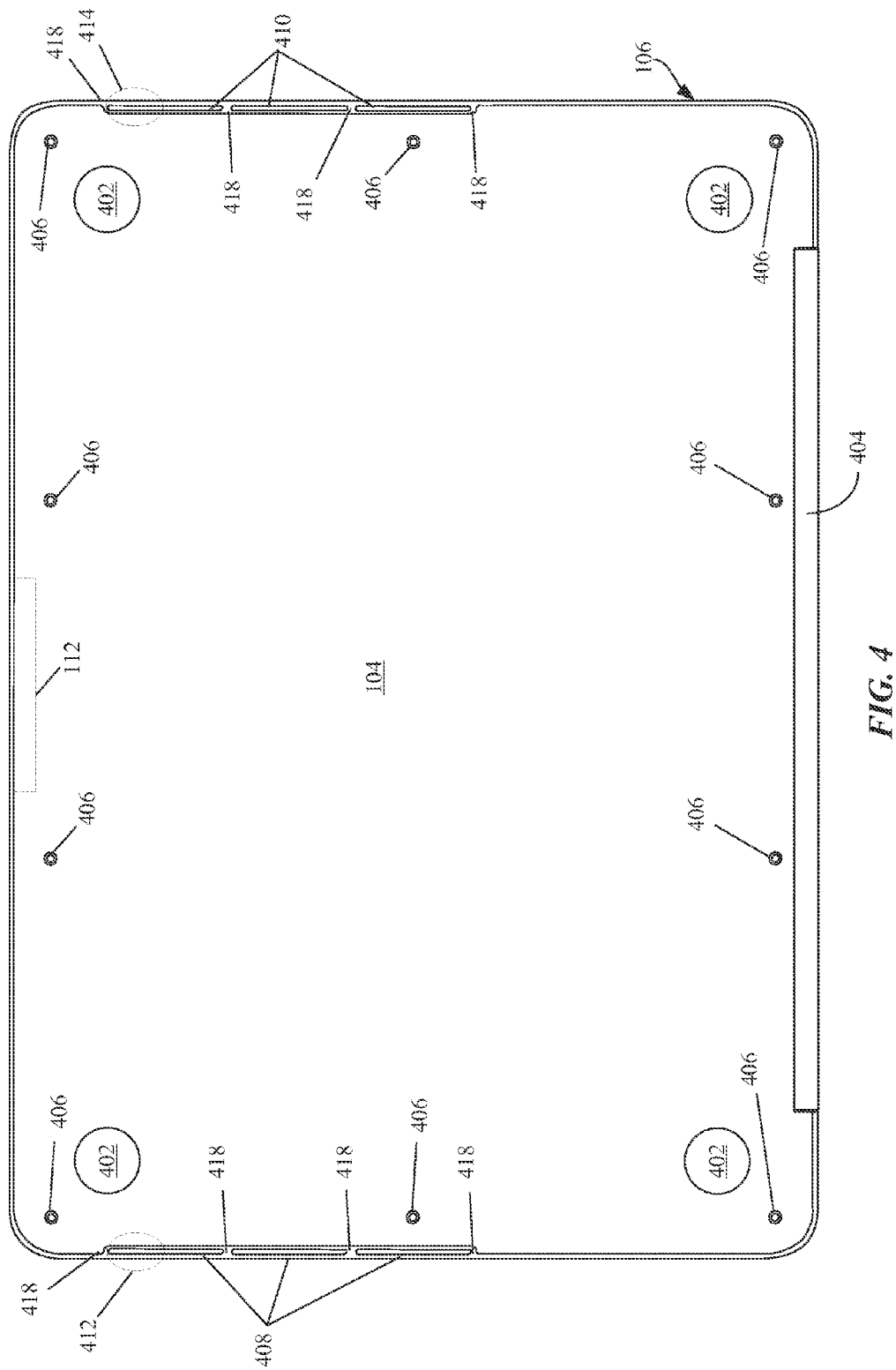
FIG. 4 shows an external view of bottom case.

FIG. 4 shows an external view of bottom case 104 showing relative positioning of support feet 402, insert 112, cosmetic wall 404 that can be used to conceal clutch assembly 110 and fasteners 406 used to secure bottom case 104 and top case 106 together. Support feet 402 can be formed of wear resistant and resilient material such as plastic. Also in view are multi-purpose front side sequentially placed vents 408 and 410 that can be used to provide a flow of outside air that can be used to cool internal components. In the described embodiment, vents 408 and 410 can be placed on an underside of top cover 106 in order to hide the vents from view as well as obscure the view of an interior of portable computing device 100 from the outside. Vents 408 and 410 can act as a secondary air intake subordinate to primary air intake vents located at a rear portion of portable computing device 100 (described below). In this way, vents 408 and 410 can help to maintain an adequate supply of cool air in those situations where portions of the rear vents are blocked or otherwise have their air intake restricted.

Vents 408 and 410 can also be used to output audio signals in the form of sound generated by an audio module (not shown). In one embodiment, a selected portion (such as portions 412 and 414) can be used to output sound at a selected frequency range in order to improve quality of an audio presentation by portable computing device 100. Vents 408 and 410 can be part of an integrated support system in that vents 408 and 410 can be machined from the outside and cut from the inside during fabrication of top case 106. As part of the machining of vents 408 and 410, stiffener ribs 416 (shown in FIG. 5) can be placed within vent openings 408 and 410 to provide additional structural support for portable computing device 100. Stiffener ribs 416 can be formed using what is referred to as a T cutter that removes material subsequent to the formation of the vent openings during the fabrication of top case 106.

Moreover, trusses 418 can be formed between vents 408 and 410 in combination with ribs 416 can add both structural support as well as assist in defining both the cadence and size of vents 408 and 410. The cadence and size of vents 408 and 410 can be used to control air flow into portable computing device 100 as well as emission of RF energy in the form of EMI from portable computing device 100. Accordingly, stiffener ribs 416 can separate an area within vents 408 and 410 to produce an aperture sized to prevent passage of RF energy. As well known in the art, the size of an aperture can restrict the emission of RF energy having a wavelength that can be "trapped" by the aperture. In this case, the size of vents 408 and 410 is such that a substantial portion of RF energy emitted by internal components can be trapped within portable computing device 100. Furthermore, by placing vents 408 and 410 at a downward facing surface of top case 106, the aesthetics of portable computing device 100 can be enhanced since views of internal components from an external observer are eliminated.

Figure 5:
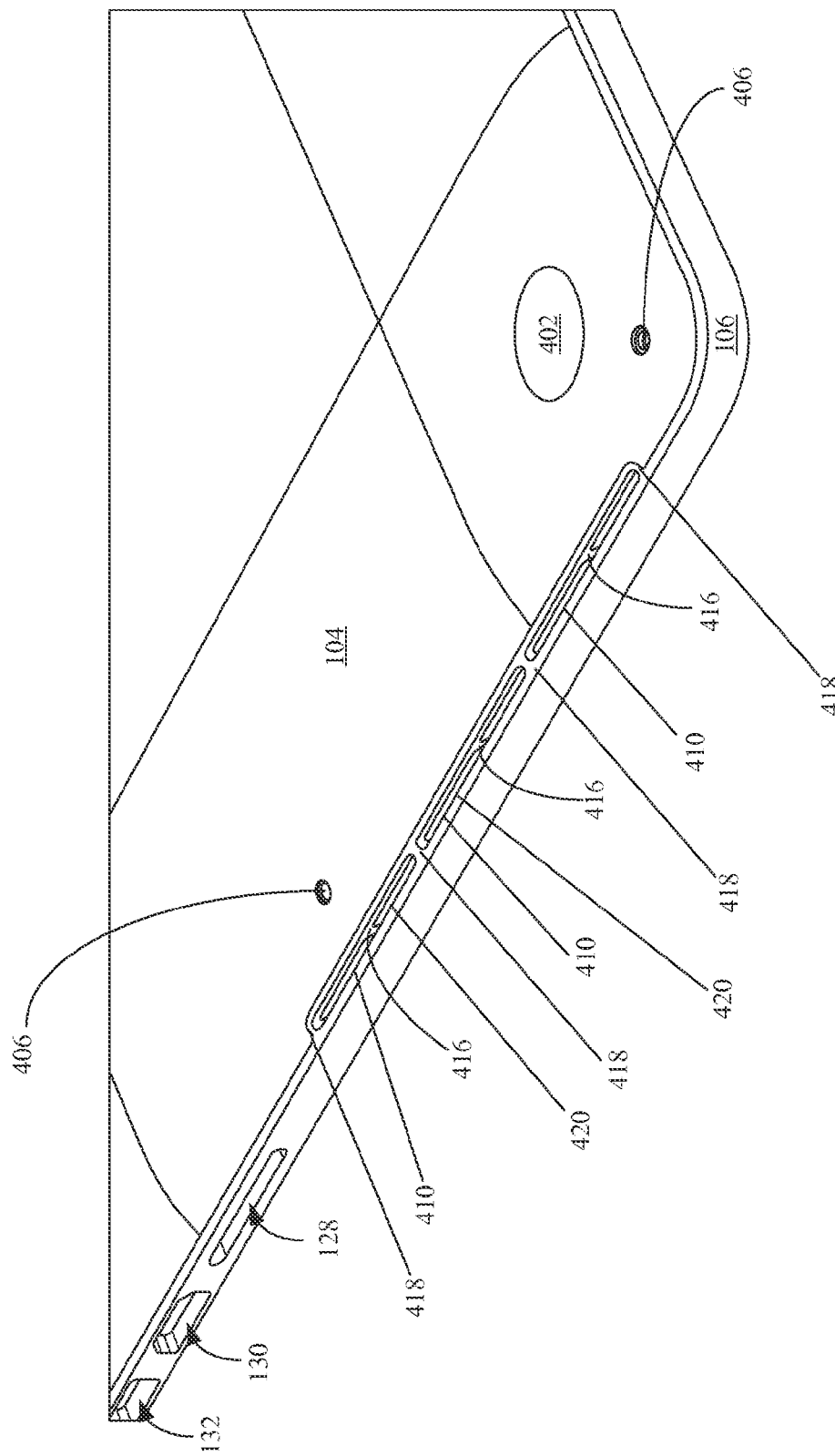
FIG. 5 shows a close up view of an integrated vent system.

FIG. 5 shows a close up view of vents 410 illustrating the relationship between the placement of vents 410 and top case 106. More particularly, vents 410 are formed during the fabrication of top case 106 in such a way that when support feet 402 are in contact with a flat surface, vents 410 (as well as 408) are not viewable from the perspective of an end-user. In this way, the appearance of uniformity of portable computing device 100 can be maintained. In addition to the aesthetic appeal of placing vents 410 on an underside portion of top case 106, vents 410 (as well as 408) are part of a system of integrated support system that can provide additional rigidity to portable computing device 100. More particularly, stiffener ribs 416 can be integrally formed with vents 410. In this way, stresses in the form of an externally applied load, for example, can be transferred by way of an integrated support system to top case 106 and to bottom case 104 without causing top case 106 to bend or warp. Accordingly, openings in top case 106 can be larger than would otherwise be possible. For example, the presence of stiffener ribs 416 permits the vents 410 to extend a substantial length of top case 106 thereby affording a substantial increase in air flow for cooling as well as, for example, provide optional porting of audio from adjacent audio transducers. It should be noted that stiffener rib 416 can bifurcate vent 410 to form aperture 420 that can block a visual line of sight (as well as thwart insertion of objects) from the outside to the interior of portable computing device 100. Moreover, the size of aperture 420 formed by stiffener rib 416 and top case 106 is such that RF energy emanating from internal components of portable computing device 100 can be effectively blocked (due in part to both the size of aperture 420 and cadence of stiffener ribs 416). The location and cadence of stiffener ribs 416 can help define the size and shape of vent 410 having the effect of limiting the amount of RF energy that can escape from portable computing device 100 as well as limiting access (either physical or visual) to the interior of portable computing device 100 from the outside.

FIG. 6A shows an interior portion of top case 106 illustrating the relationship between vents 410, stiffener ribs 416, trusses 418 and a portion of the integrated support system of top case 106 (shown in dotted lines). As can be seen, vents 410 are integrally formed into top case 106 and are supported by stiffener ribs 416 that are integrally formed with the integrated support system of top case 106. Stiffener ribs 416 provide additional support for vents 408 and 410 during normal operation as well as prevent damage during unexpected events such as a drop event. For example, when portable computing device is picked up or experiences a drop event, stiffener ribs 416 can provide structural support for vents 410 as well as can provide a path for the applied load to transfer from the point of contact to the integrated support system. In this way, an applied load can be transferred away from vents 410 along stiffener ribs 416 to top case 106 where the applied load can be distributed by the integrated support system thereby avoiding stress points that can cause bending or warping or otherwise damage internal components.

Figure 6B:
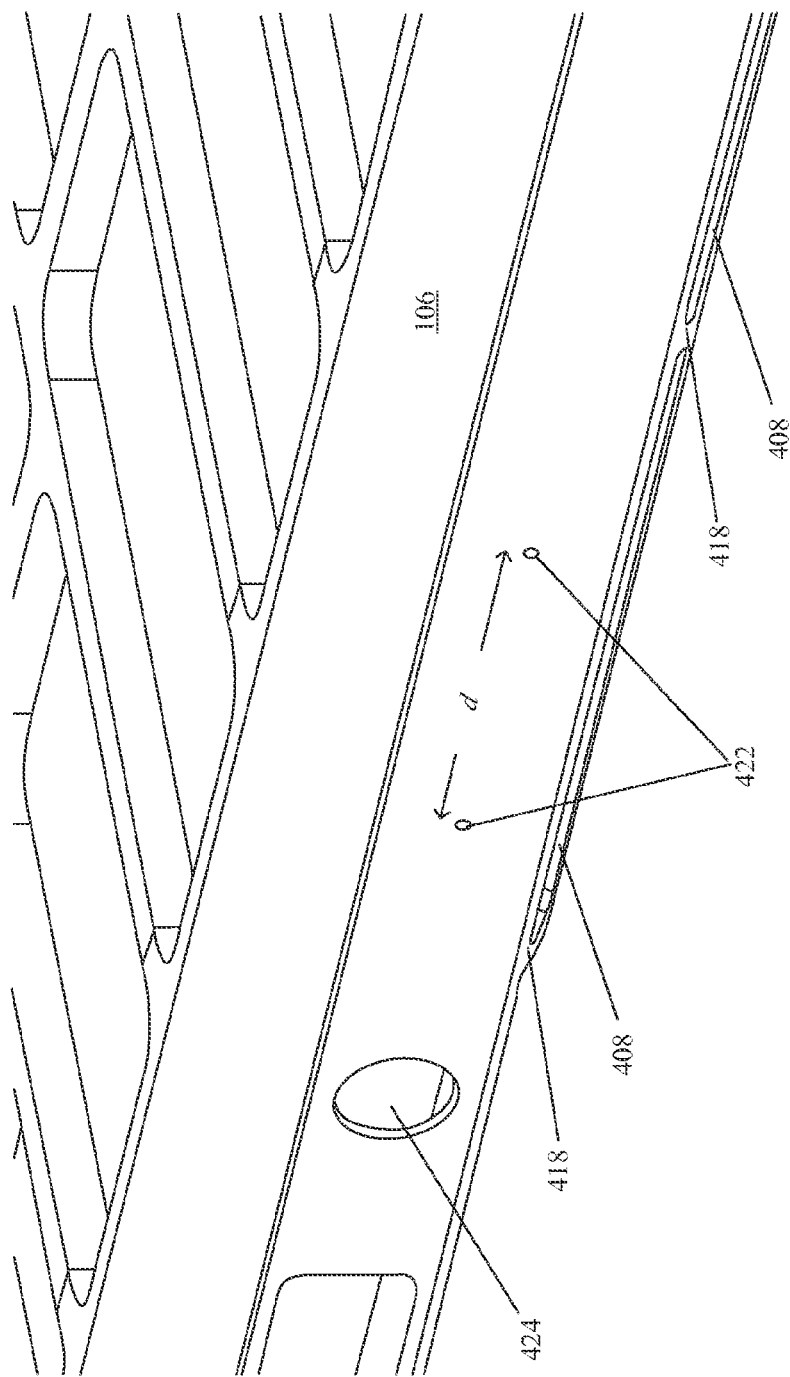
FIG. 6B show an example of side microphone openings in accordance with the described embodiments.

FIG. 6B shows an embodiment of top case 106 having microphone openings 422 suitable for receiving audio signals and audio jack opening 424. In this embodiment, microphone openings 422 are spaced apart distance "d" in order to facilitate error correction in speech recognition algorithms. Distance d can vary depending upon a desired frequency response. For example, distance d can be on the order of about 15 mm. Although not readily apparent from FIG. 6B, microphone openings 422 can be part of an internal microphone system. In one case, microphone openings 422 can lead to audio ports that lead to an audio circuit having a transducer for converting audio signals (in the form of a voice, for example) into digital data for subsequent processing. The audio ports can be formed as part of top case 106. In order to conserve the amount of space required for the audio ports, the audio ports can connected to an audio circuit disposed within portable computing device 100 by way of audio channels. The audio channels can be "slanted" at angle θ that provides an appropriate channel length for tuning. For example, angle θ can be about 22°.

Figure 7A:
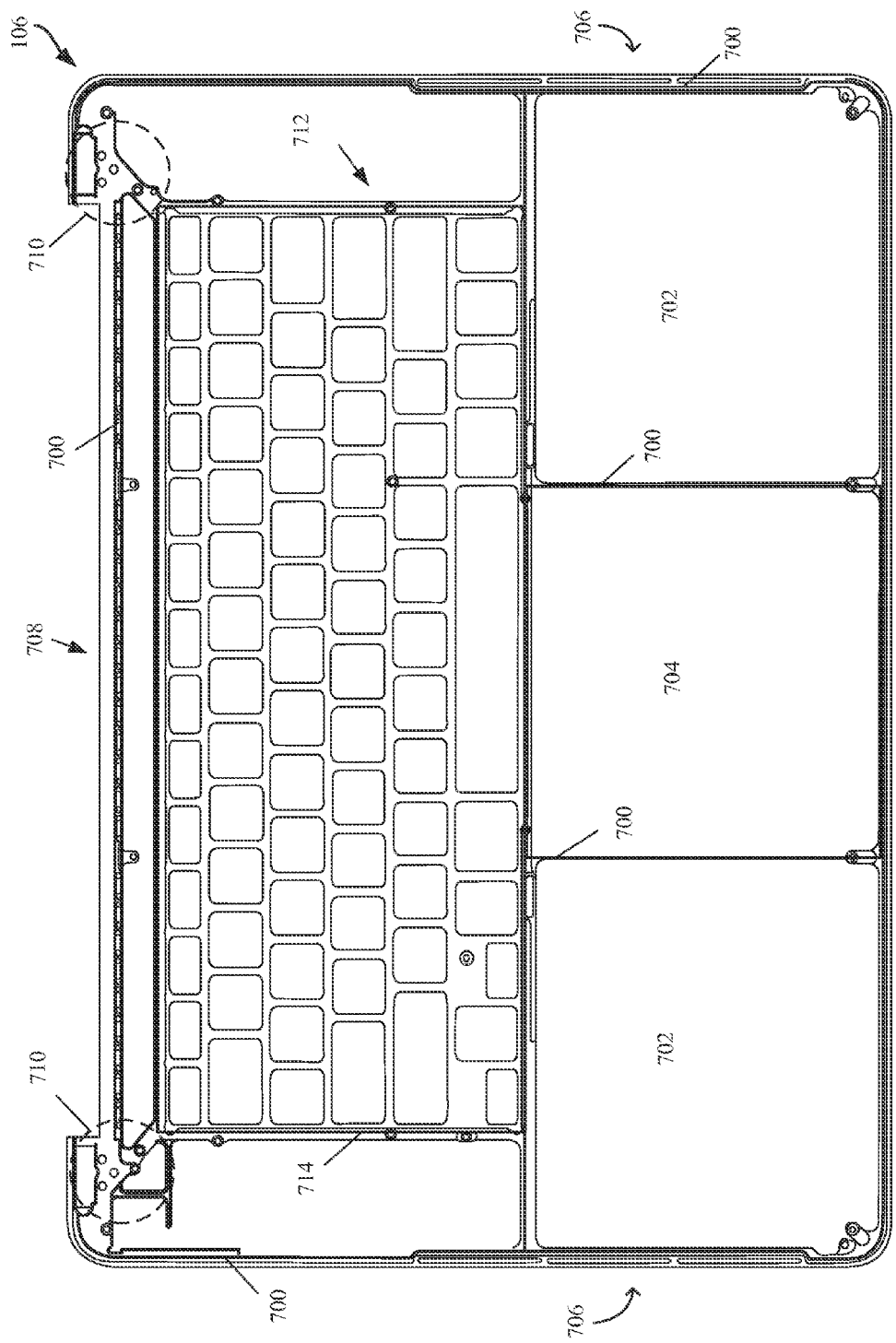
FIG. 7A shows integrated support system in accordance with the described embodiments.

FIG. 7A shows integrated support system 700 in accordance with the described embodiments. Generally speaking, top case 106 can be divided into various structural zones each of which can be expected to experience varying amounts and types of externally applied loads. For example, top case 106 can include palm rest zone 702 that can be expected to experience an external load applied by a user resting a palm or hand on top case 106 in the vicinity of palm rest zone 702. Other structural zones can include touch pad zone 704, side vents zone 706, rear vent zone 708, clutch bolt zone 710, and keyboard zone 712 each of which can be expected to experience varying amount and types of externally applied loads. Accordingly, integrated support system 700 can be configured in such a way to take into account the load expected at each of the structural zones. In addition, structural support system 700 can provide support elements (such as bosses) that can be used to mount internal components to top case 106.

In this way, components installed within top case 106 can use the support elements of integrated support system 700 to tie into top case 106. In particular, integrated support system 700 is formed to have substantially no breaks or gaps thereby providing a unified support structure for top case 106. For example, keyboard zone 712 can include keyboard support rib 714 that surrounds and defines a keyboard opening in keyboard zone 712. In order to provide added structural support, keyboard support rib 714 can have an enhanced thickness that provides a substantially increased resistance to flexing or bending (that is proportional to thickness$^3$). In this way, any loads applied to a keyboard can be transferred by way of keyboard support rib 714 to top case 106.

In order to provide uniform support for top case 106, integrated support system 700 can span top case 106 in a "crisscross" pattern. In this way, flexing of top case 106 in which a central portion of top case 106 flexes more than does the edge portions (referred to as a "trampoline" effect) can be greatly reduced. Accordingly, integrated support system 700 can cause portable computing device 100 to respond to an externally applied load as an integrated whole. In contrast, conventionally configured portable computing devices where internal components are discretely attached to a housing with little or no cross support can bend and warp resulting in damaged components.

Figure 7B:
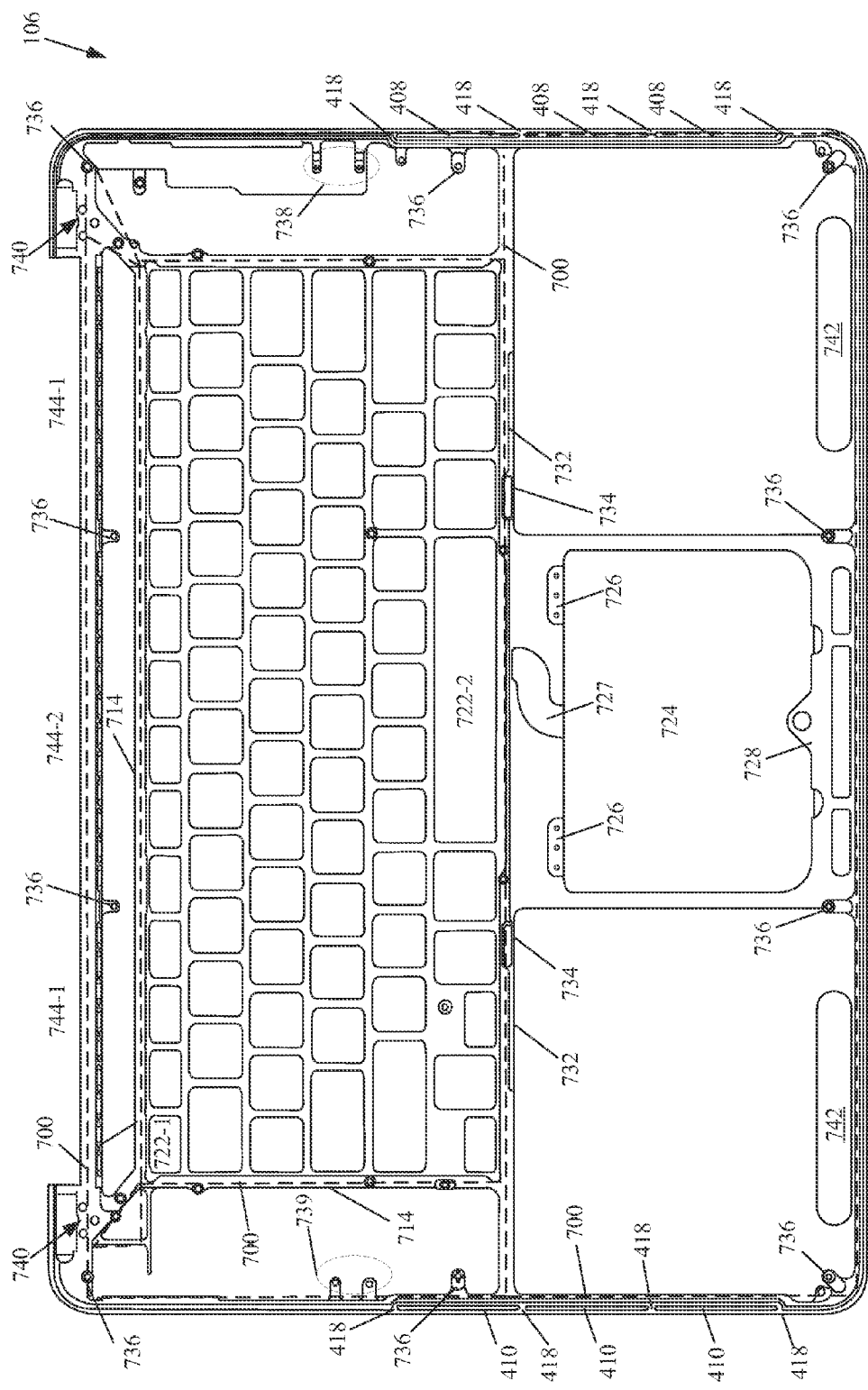
FIGS. 7B-7C shows views of top case highlighting the relationship between integrated support system can various structural components in accordance with the described embodiment.
Figure 7C:
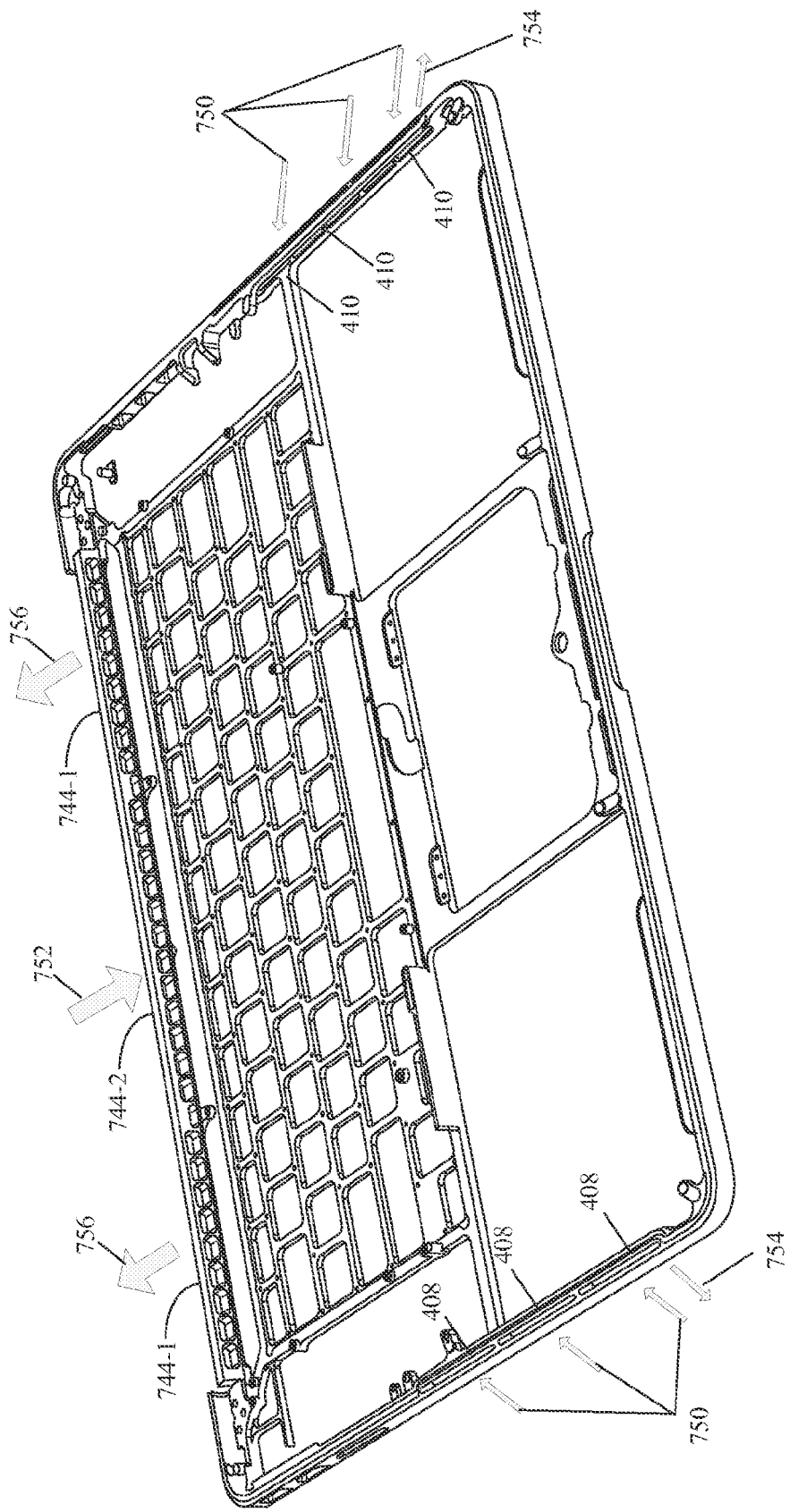

FIGS. 7B-7C shows views of top case 106 highlighting the relationship between integrated support system 700 and various structural components in accordance with the described embodiment. For example, FIG. 7B shows an interior view of top case 106 illustrating various openings used to accommodate keyboard 114 and touch pad 116. More specifically, keyboard openings 722 can each have a size and shape in accordance with an associated key cap assembly. For example, opening 722-1 can be sized to accommodate power button 118-1 whereas opening 722-2 can be sized to accommodate a space bar. In addition to keyboard openings 722, opening 724 can accommodate touch pad 116. For example, touch pad 116 can be attached directly to top case 106 at shoulders 726 and flex support 727 can be used to provide support for a flex connector. Furthermore, a dome switch associated with touch pad 116 can be supported at support plate 728.

Top case 106 can be fabricated in such a way that integrated support system 700 (as shown by the dotted line) can be used to provide support for internal components as well as a mechanism for distributing loads more evenly about top case 106 thereby avoiding localized stress points. In this way, the likelihood of warping or bowing of top case 106 can be substantially reduced. In addition to providing for load distribution, integrated support system 700 can provide support points and structures for various internal components. For example, as described above, stiffener ribs 416 can be integrally formed with integrated support system 700 in such a way that an external load applied to portable computing device 100 in the vicinity of vents 410 (or 408) can be passed by way of stiffener ribs 416 to integrated support system 700. In this way, the load can be transferred away from the point where the load is applied and distributed more evenly about top case 106 and bottom case 104 thereby reducing the possibility of warping or bowing.

As part of integrated support system 700, magnetic clamp supports 732 can provide a support structure for magnet pad

734. Magnet pad 734 can be used to support magnets that magnetically attach top case 106 and bottom case 104 together. By magnetically attaching top case 106 and bottom case 104, the insertion of and securing of fasteners 406 into bosses 736 can be made more efficient. For example, during an assembly operation, top case 106 and bottom case 104 can be magnetically attached to each other using magnets secured to magnet pad 734. The magnetic attraction is such that sufficient "play" in (x,y) direction is available for securing fasteners 402 into bosses 736. The increase in play makes it easier to insert fasteners 402 into bosses 736 which can make the overall assembly process easier and more efficient. In addition to making assembly easier and more efficient, securing top case 106 and bottom case 104, an amount of flexion of a central region of bottom case 104 can be greatly reduced thereby preventing "belly rub" (where an exterior surface of bottom case 104 flexes to the point where it comes in contact with a surface upon which it rests). Furthermore, various components can be connected to integrated support system 700 when mounted to top case 106. For example, audio jack mounts 738 can be part of integrated support system 700 and be used to mount an audio jack to top case 106. The same can be said for microphone mounts 739 that can be used to mount a side firing microphone to top case 106 and clutch assembly support plates 740 that can be used for securing clutch assembly 110 to top case 106.

In order to provide a secure environment and reduce the likelihood of lid 108 becoming disengaged while portable computing device 100 is being transported in the closed configuration, magnetic attachment plates 742 can be used to form a magnetic circuit with magnets disposed within lid portion 108. The magnetic circuit can be used for securing lid portion 108 to base portion 102 in the closed configuration. In this way, an end user can use inset portion 112 to aid in breaking the magnetic circuit in order to lift lid 108 from base portion 102.

In addition to side vents 408 and 410, rear vent openings 744 can be used to provide air for cooling internal components such as a CPU, GPU and so forth. In one embodiment, left and right vent openings 744-1 can be used to direct exhaust air away from portable computing device 100 whereas central vent openings 744-2 can be used to direct cooler intake air into portable computing device 100. In addition to vent openings 744, vent openings 408 and 410 can be used as a secondary source of cool intake air in those situations with vent openings 744-2 are partially or fully blocked to assure adequate cooling of various internal components. Rear vent openings 744 can be formed in much the same manner as side vents 408 and 410 in that rear vent openings 744 can be formed as part of integrated support system 700. In this way, a load applied in the proximity if rear vent openings 744 can be transferred to integrated support system 700 and away from rear vent openings 744. In this way, the likelihood of bending or warping top case 106 in the vicinity of rear vent openings 744 can be substantially reduced. Furthermore, by providing the added support, rear vent openings 744 can span a much larger portion of top case 106 than would otherwise be possible. By increasing the extent of rear vent openings 744, a commensurate increase in air intake and exhaust can be realized thereby increasing the amount of available cooling resources. By increasing the amount of cooling resources, internal components such as GPU and or CPU can "run hotter" in order to provide faster processing if necessary.

FIG. 7C shows a perspective view of top case 106 highlighting both air flow patterns and an audio path. In particular, vents 408 and 410 can be shown to act to support secondary air intake flow 750. Secondary air intake flow 750 can support primary air intake flow 752 at rear vent 744-2. In this way, if primary air intake flow 752 is reduced (by obstruction of rear vent 744-2, for example), secondary air intake flow 750 can at least partially compensate for the reduction in primary air intake flow 752 to maintain adequate air exhaust airflow 756 for cooling of internal components.

In addition to secondary air intake flow 750, at least a portion of vent 408 and 410 can optionally be used to port audio 754. In one embodiment, audio 754 can be associated with a specific frequency range corresponding to, for example, lower frequencies of the audible frequency range associated with a woofer of an audio module (or higher frequencies associated with a tweeter). In any case, vents 408 and 410 are configured to provide multiple functions.

Figure 8:
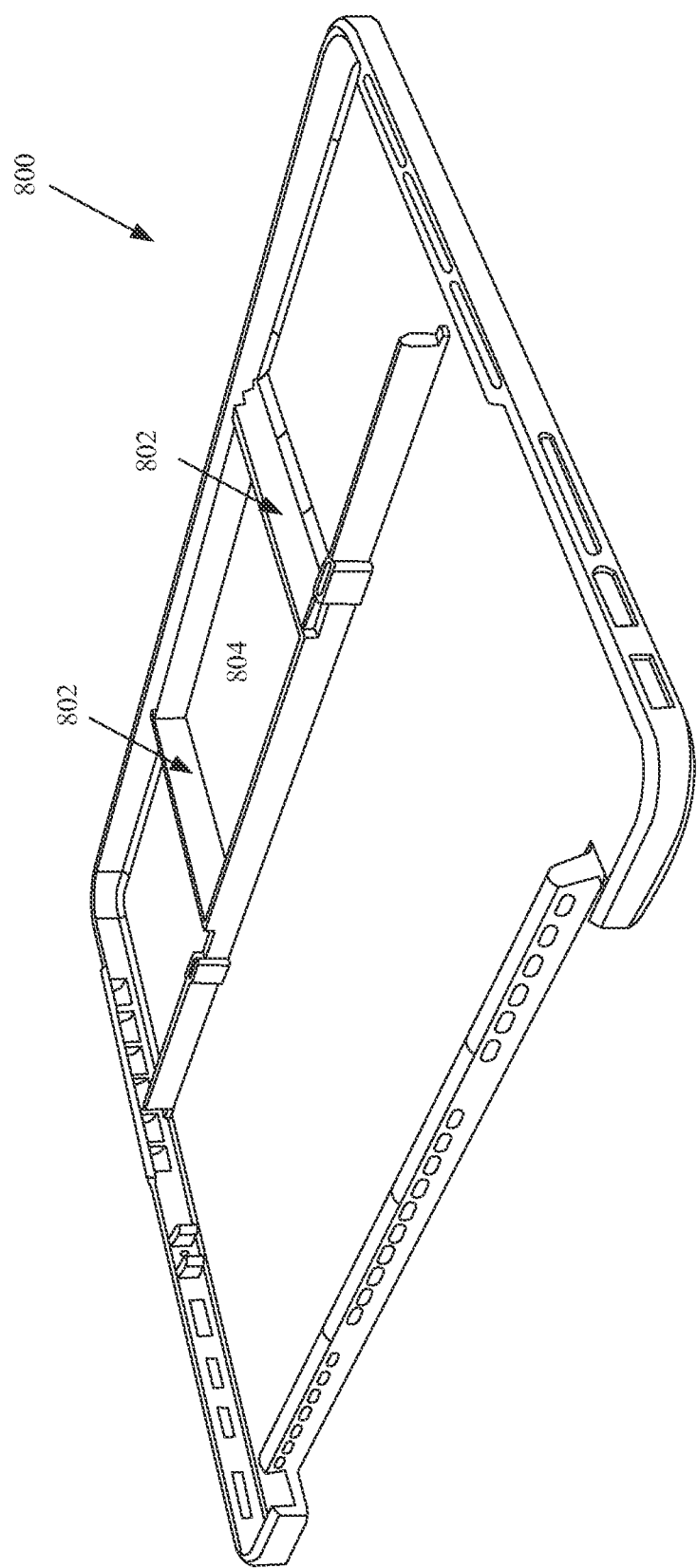
FIG. 8 shows an embodiment of top case well suited for those portable computing devices that utilize a mass storage device in the form of a hard disk drive (HDD).

It should be noted that top case 106 can be modified in many ways to accommodate different configurations of portable computing device 100. For example, FIG. 8 shows how top case 306 (and in some cases top case 106) in the form of top case 800 can be modified to support various configurations of the portable computing device. More particularly, FIG. 8 shows top case 800 well suited for those portable computing devices that utilize a mass storage device in the form of a hard disk drive (HDD). (It should be noted that for clarity, keyboard openings and other features are omitted.) Top case 800 can include (in addition to the features discussed with respect to top case 106), HDD support structure 802 that can be used to provide support for a mass storage device in the form of a hard disk drive. HDD support structure 802 is also part of integrate support system 700 and as a result provides additional support and rigidity to top case 800. In some embodiments, HDD support structure 802 can also provide support of track pad module 116. In this arrangement, track pad module 116 can be placed within recess 804 formed by HDD support structure 802 and secured to top case 802. Next, a hard disk drive can then be placed within recess 804 in proximity to the hard disk drive and secured to HDD support structure 802 using foam clips, for example, affording the hard disk drive increased protection against shock or other induced vibrations.

Figure 9:
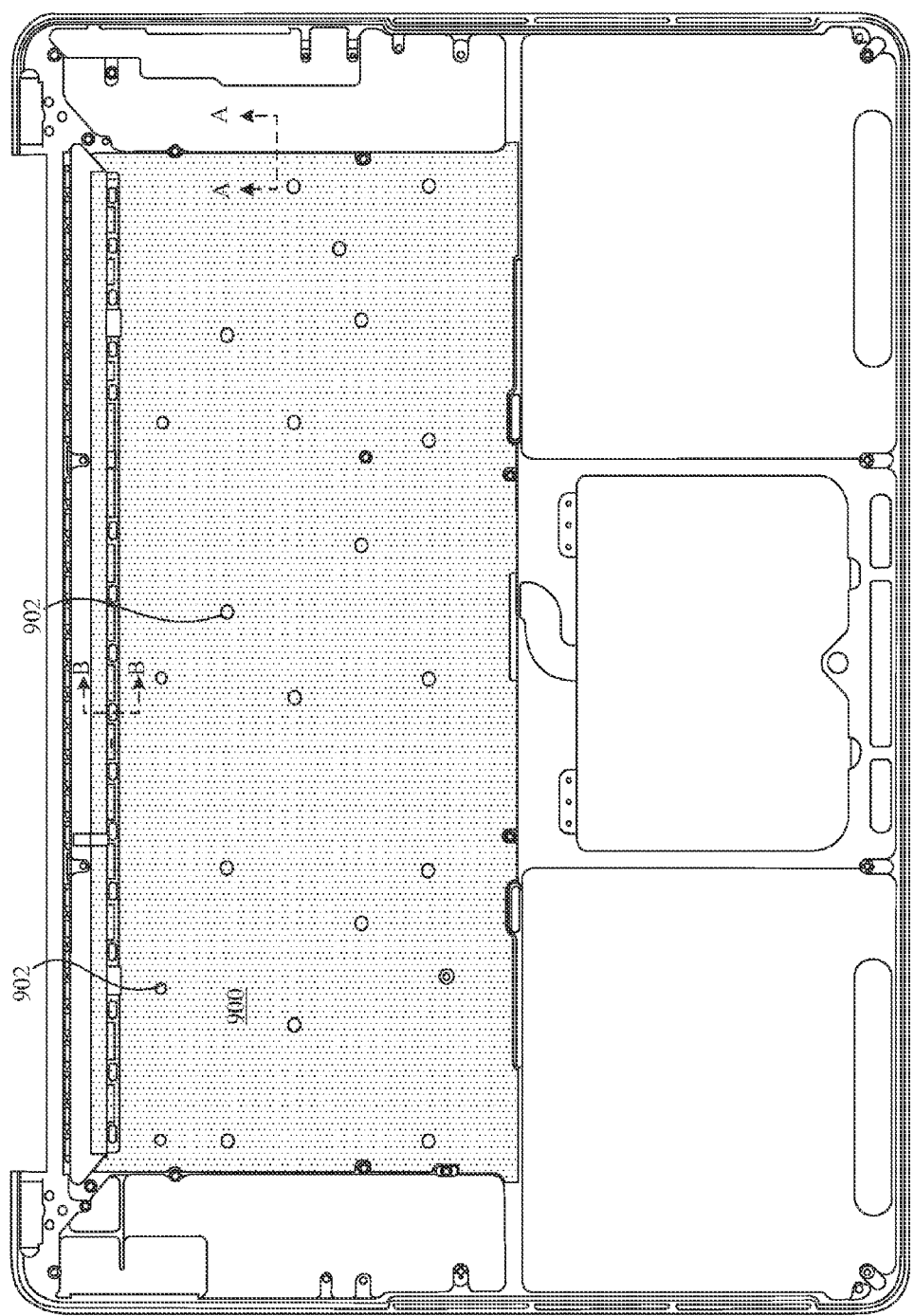
FIG. 9 illustrates feature plate used to support and enclose a keyboard module fastened to top case by way of numerous rivets.

FIG. 9 illustrates feature plate 900 used to support and enclose a keyboard module fastened to top case 106 by way of numerous fasteners 902 such as screws, rivets, etc. Numerous advantages, however, can be realized by way of having a feature plate 900 that is riveted to a top case 106 by way of multiple rivets 902 to enclose various internal components therein. For example, the combination of the top case 106 and steel feature plate 900 can result in the creation of an effective EMI shield (shown and described in more detail below) that can take the form of a Faraday cage type shield. This EMI shielding effect is enhanced by the use of numerous fastening points held together by rivets 902, which tends to seal off the internal components of the keyboard better than when fewer fastening points are used, such as in a screw or bolt type arrangement. This EMI shield then effectively isolates the keyboard in an EMI sense from various other components in the computing device, such as the processor or any antenna that may be at the device.

As another benefit, using a rivet rather than other types of fastening components, such as screws, bolts and the like results in no need for the fastening component to extend through the top case 106. This is also advantageous in that manufacturing riveting processes can be significantly faster than similar screwing or bolting processes, in that the obverse side of the components being riveted does not need to be accessed in some cases, such as that which is disclosed above. Another benefit that can be realized by using rivets instead of screws is that the overall assembly can be thinner, particularly since there is no longer a need to accommodate threaded structures or components, which can take up space.

The use of rivets rather than screws can lead to simpler manufacturing processes that tend to save costs, are faster, and can also result in the use of more fastening points, which in turn leads to greater integrity in components that are fastened together more reliably. The overall feel of a riveted together top case, keyboard and feature plate assembly is also improved by using rivets rather than screws, as the combination of components tends to be stiffer, more stable, and more affixed together as an overall assembly.

Figure 10:
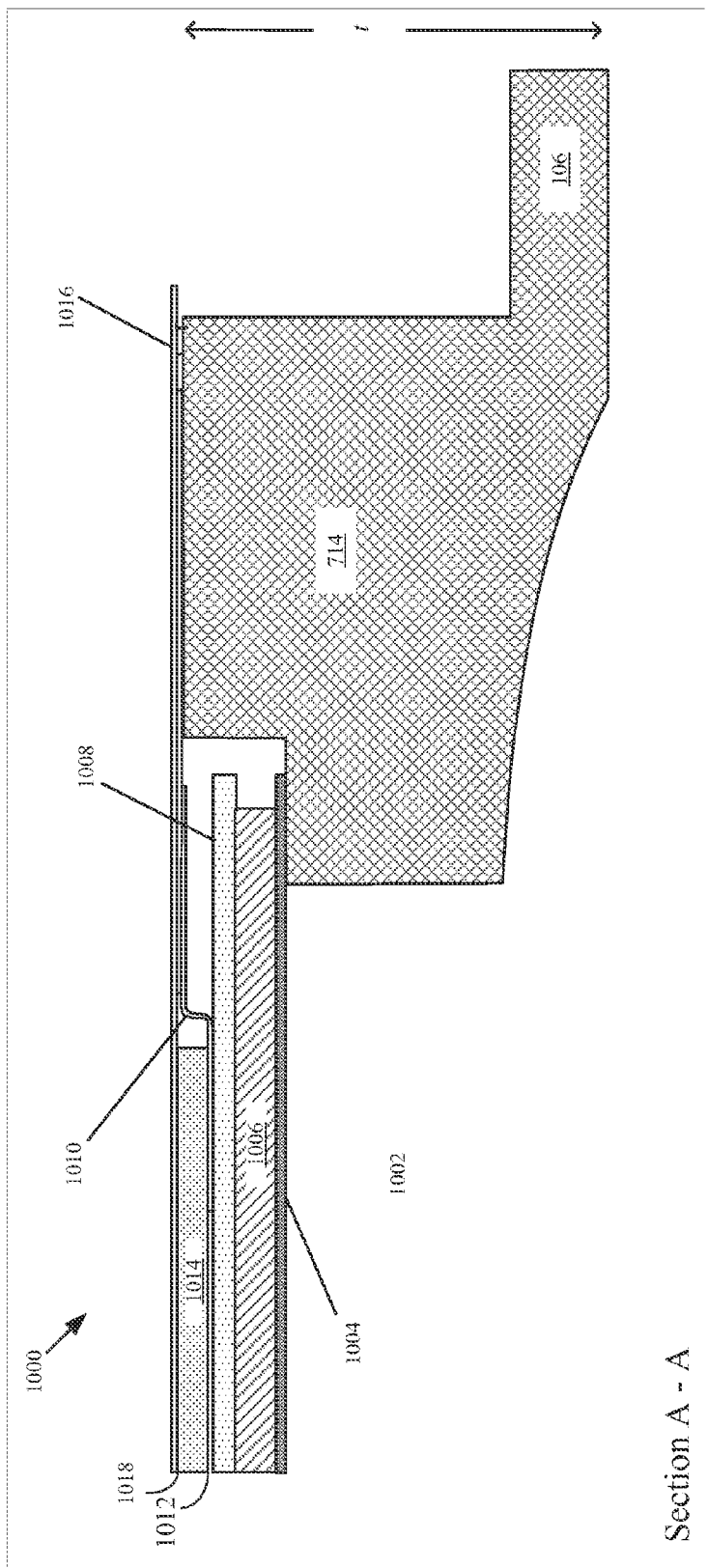
FIG. 10 shows a cross section of portion through cross section A-A highlighting an integrated EMI shield/light block structure.

FIG. 10 shows a cross section of portion 904 through cross section A-A highlighting an integrated EMI shield/light block structure 1000 (hereinafter referred to as EMI shield) in accordance with the described embodiments. As is well known, electronic components can be a source of electromagnetic radiation in the RF band that can result in electromagnetic interference, or EMI shield, that can disrupt the performance of sensitive electronic components. A keyboard and its associated circuitry can therefore be a source of EMI. This is particularly true in situations that present a ground floor problem such as when portable computing device 100 is in the closed configuration and copious amount of EMI can leak from keyboard circuitry. Accordingly, in addition to providing structural support for keyboard 114, keyboard support rib 714 can provide a reference datum for an enclosure that can act as both an EMI shield as well as a light trap. More specifically, the enclosure can form a Faraday cage that can trap EMI as well as sequester extraneous light from a light source (such as a light guide panel, or LGP) used for illumination (such as for illuminating key caps).

Accordingly, FIG. 10 shows cross section A-A shown in FIG. 9 illustrating the relationship between keyboard support rib 714 and how it can provide a reference datum for both an EMI shield and light trap. Moreover, keyboard support rib 714 can have an enhanced thickness "t" in order to provide a substantially increased resistance to flexing or bending (that is proportional to $t^3$). Keyboard assembly 1000 can include a keycap (not shown) disposed within well 1002. Keyboard dome sheet 1004 can be used to translate a physical key press at keycap 118 to an electrical switching event that can be received at keyboard membrane 1006. Keyboard feature plate 1008 can be form of metal such as steel. In the described embodiment, keyboard feature plate 1008 can be used to support keyboard membrane 1006, keyboard dome sheet 1004, and mask 1010 in contact with first surface 1012 that masks light from light guide panel (LGP) 1014 in accordance with pre-selected illuminated portions of keycap 118. Light from LGP 1014 is provided by a discrete light source such as an LED (shown in FIG. 11). In order to maximize the amount of light provided to keycap 118 at first surface 1012, reflector layer 1016 can be disposed on second surface 1018 of LGP 1014. Reflector layer 1014 can be a metallic foil that in combination with keyboard feature plate 1008 can form an enclosure that is well suited for trapping excess light from the LED as well any EMI generated by keyboard membrane 1006. As shown, keyboard support rib 714 can act as a reference datum for reflector layer 1016. In this way, feature plate 1008 and reflector layer 1016 together can completely seal LGP 1014 to prevent excess light and EM radiation from escaping. In this way, the structural support rib 714 can form part of a light trap configured to prevent leakage of light from a light source in the keyboard assembly as well as provide a reference datum for the EMI shield and the light trap.

Figure 11:
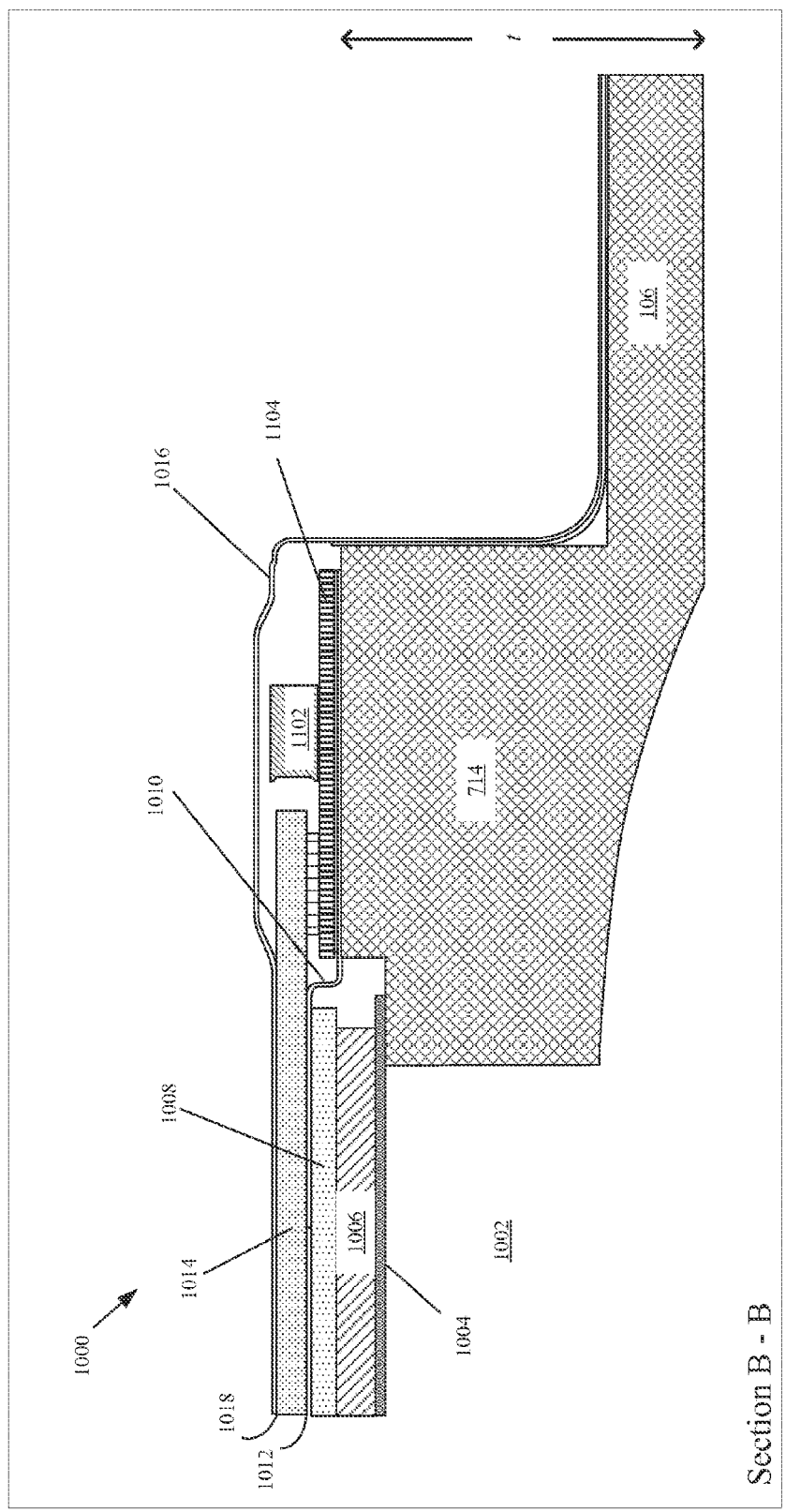
FIG. 11 shows a cross section of portion through cross section B-B highlighting an integrated EMI shield/light block structure.

FIG. 11 shows a cross section B-B shown in FIG. 9 highlighting another aspect of keyboard assembly 1000 in accordance with the described embodiments. In addition to elements shown in FIG. 10 at cross section A-A, includes a number of other components such as light producing element 1102 (that can take the form of an LED), driver board 1104, and connector 1106.

Figure 12:
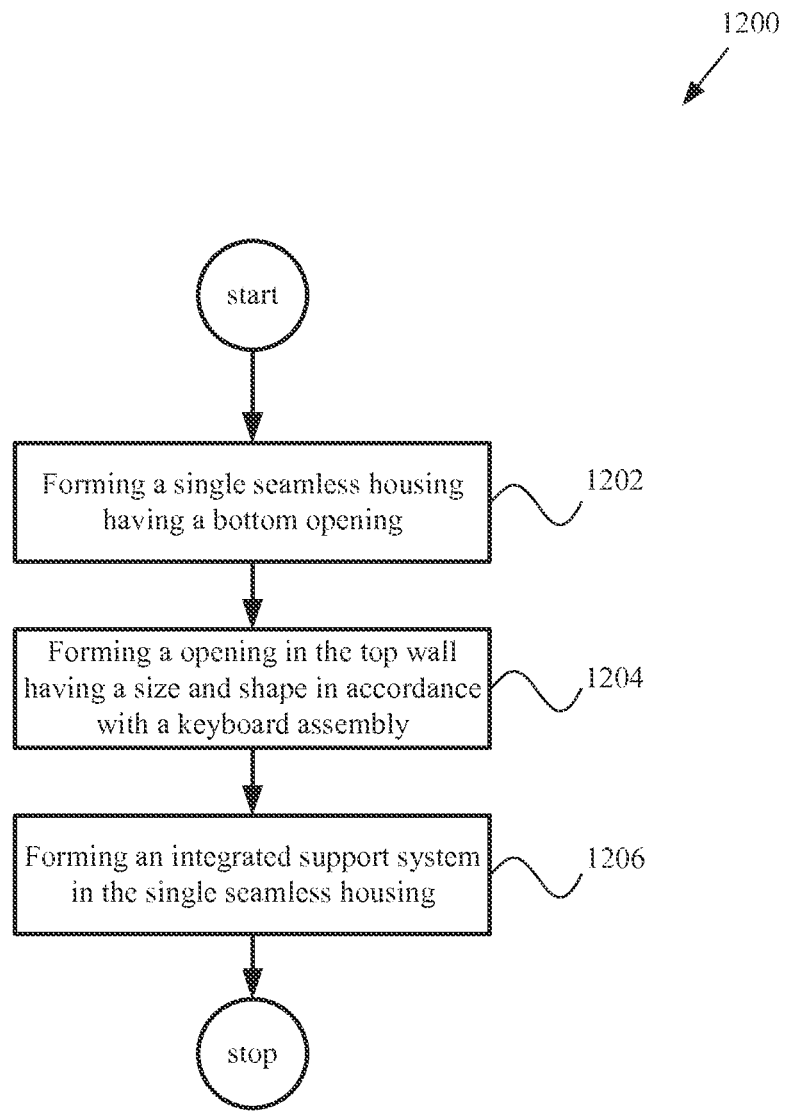
FIG. 12 shows a flowchart detailing process in accordance with the described embodiments.

FIG. 12 shows a flowchart detailing process 1200 in accordance with the described embodiments. Process 1200 can be used to form top case well suited for a portable computing device. Accordingly, process 1200 can start at 1202 by forming a single pieced seamless housing having a bottom opening. In the described embodiment, the forming can be carried out using any number of machining techniques. For example, the forming can be carried out using computer numerical control (CNC) machining techniques well known to those in the art. The single piece seamless housing can be formed of any number of materials, such as aluminum, steel, and so forth. In the case where the single piece seamless housing is formed of aluminum, the forming can be carried out on a single billet of aluminum. The single piece seamless housing can have a shape well suited for being carried about. For example, the single piece housing can have an integral top and side walls that cooperate to form a cavity in cooperation with the bottom opening with a downward sloping edge of the side walls surrounding and defining the front opening. In this way, the single piece housing can be easy to carry and can have an aesthetically pleasing appearance.

At 1204, an opening is formed in the top wall. In one embodiment, the opening can have a size and shape in accordance with a keyboard assembly. At 1206, an integrated support system is formed in the single piece seamless housing. The integrated support system provides structural support for the single piece seamless housing. The integrated support system can prevent warping and bowing by distributing a load applied at the single piece seamless housing in such a way that the probability of warping or bowing of the single piece seamless housing is substantially reduced. In one embodiment, the integrated support system includes a structural support rib that surrounds and defines the keyboard opening. The structural support rib provides support for the keyboard assembly as well as is part of an EMI shield that prevents leakage of EM radiation from the keyboard assembly and prevents leakage of light from the keyboard assembly.

Figure 13:
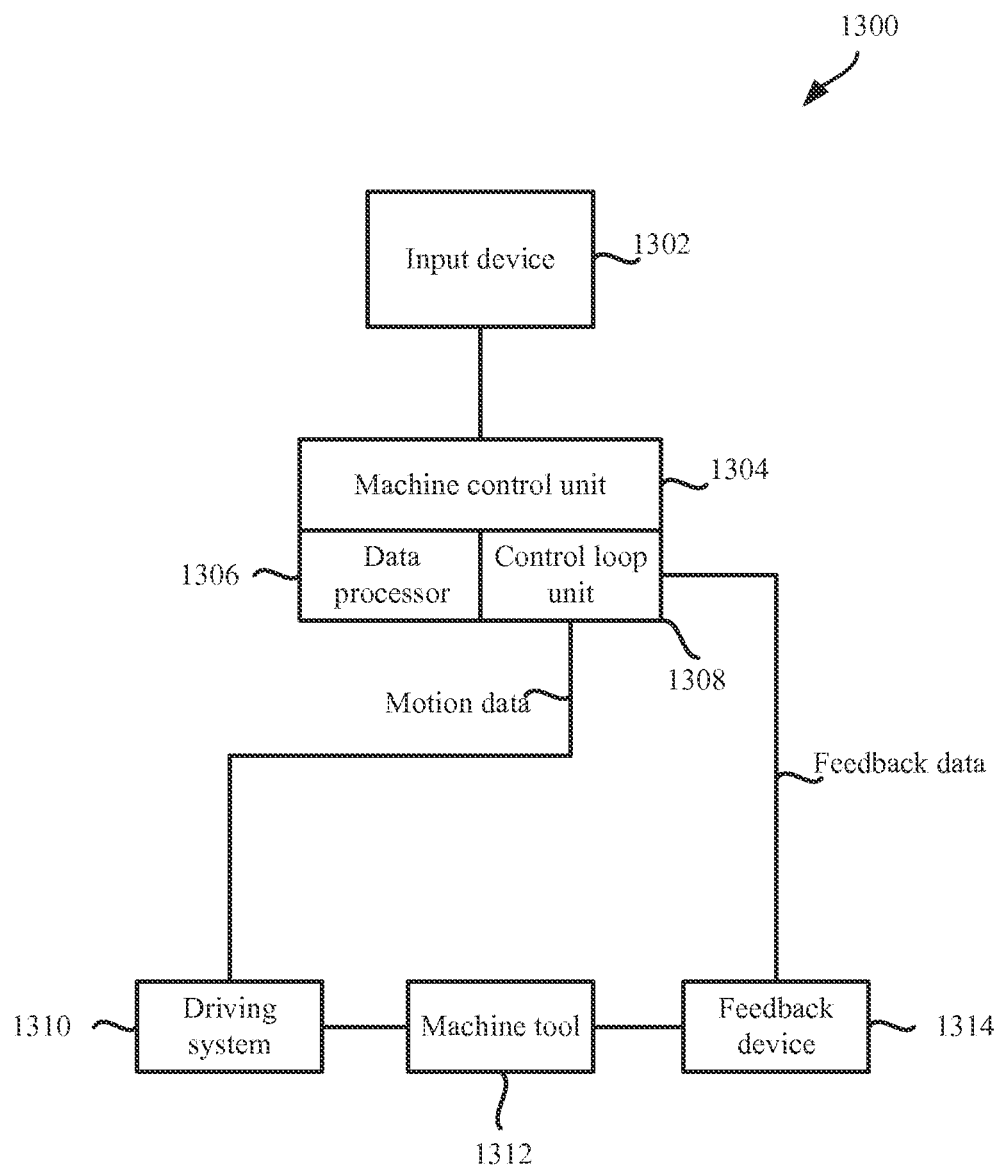
FIG. 13 is a block diagram of an arrangement of functional modules utilized by CNC system in accordance with the described embodiments.

FIG. 13 is a block diagram of an arrangement of functional modules utilized by CNC system 1300 in accordance with the described embodiments. CNC system 1300 can take the form of a closed loop system that can include feedback devices that monitor an output. In this way, any disturbance or detected variance can be quickly corrected providing a highly accurate result. In one embodiment, CNC system 1300 can use various robots or other automated equipment. In any case, CNC system 1300 can include input device 1302 that can include operating instructions related to workpiece machining, specifications, and so forth. Machine control unit 1304 can include data processor 1306 configured to provide computing resources and control loop unit 1308 configured to receive feedback data that can be used to alter an operation of driving unit 1310 using, for example, motion data. Driving unit 1310 can, in turn, control machine tool 1312 that operates to machine a work piece. Feedback device 1314 can monitor various parameters of the machining operation in order to provide feedback data to control loop unit 1308.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

While the embodiments have been described in terms of several particular embodiments, there are alterations, permutations, and equivalents, which fall within the scope of these general concepts. It should also be noted that there are many alternative ways of implementing the methods and apparatuses of the present embodiments. It is therefore intended that the following appended claims be interpreted as including all such alterations, permutations, and equivalents as fall within the true spirit and scope of the described embodiments.

What is claimed is:

1. A portable computing device housing, comprising:
   a single piece top case having a top wall and sidewalls, the sidewalls including edges that define an opening leading into the single piece top case;
   side vents defined by a downward sloping portion of one of the sidewalls, the downward sloping portion protruding from the edge of the sidewall into the opening; and
   a bottom case secured to the single piece top case and in direct contact with the downward sloping portion of the sidewall, the bottom case covering the opening defined by the single piece top case and cooperating with the single piece top case to define the interior of the portable computing device housing.

2. The portable computing device housing as recited in claim 1, wherein the sidewall defining the side vents is a first sidewall and wherein a second sidewall of the single piece top case also includes a downward sloping portion defining additional side vents, the first sidewall being positioned on a side of the single piece top case opposite the second sidewall.

3. The portable computing device housing as recited in claim 2, further comprising:
   rear vents integrally formed in and positioned along a third sidewall of the single piece top case,
   wherein a first portion of the rear vents is configured to receive a primary intake airflow from the external environment and a second portion of the rear vents is configured to provide a primary exhaust airflow to the external environment.

4. The portable computing device housing of claim 3, wherein the side vents receive a secondary intake airflow that compensates in part for any reduction in the primary intake airflow.

5. The portable computing device housing as recited in claim 3, further comprising cooling fans enclosed within the portable computing device housing, each of the cooling fans having an exhaust opening proximate to the second portion of the rear vents.

6. The portable computing device housing as recited in claim 5, wherein the first portion of the rear vents is disposed along a central portion of the third sidewall.

7. The portable computing device housing as recited in claim 1, wherein each of the side vents is bifurcated by a stiffener rib such that multiple apertures lead into each side vent.

8. The portable computing device housing as recited in claim 1, wherein the portable computing device housing is formed of aluminum and at least an exterior surface of the portable computing device housing is formed of a layer of anodized aluminum.

9. A portable computing device, comprising:
   a single piece top case, comprising:
      a side vent system, comprising:
         side vents defined by a downward sloping portion of the single piece top case, the downward sloping portion protruding from an edge of a sidewall of the single piece top case; and
      a bottom case secured within an opening defined by the single piece top case, a peripheral edge of the bottom case being in direct contact with the downward sloping portion of the single piece top case.

10. The portable computing device as recited in claim 9, further comprising a keyboard assembly secured to an interior facing surface of the single piece top case, the keyboard assembly comprising a number of keycaps extending through a number of keycap openings having a shape and size in accordance with the keycaps, the keycap openings being defined by the single piece top case.

11. The portable computing device as recited in claim 9, further comprising:
   a rear vent system including rear vents disposed at a rear portion of the single piece top case, the rear vent system configured to facilitate a primary air exchange between an interior of the portable computing device and an external environment.

12. The portable computing device as recited in claim 11, further comprising:
   a speaker disposed within the single piece top case and oriented to direct audio towards the side vent system during playback of a media asset by the portable computing device so that a portion of the side vents outputs audio within a predetermined frequency range.

13. The portable computing device as recited in claim 12, wherein the portion of the side vents are sized to correspond to the predetermined frequency range of the output audio.

14. The portable computing device as recited in claim 9, further comprising:
   heat emitting components disposed within the single piece top case,
   wherein the side vent system periodically directs an intake of cooling air towards the heat emitting components within the single piece top case during operation of the portable computing device.

15. A portable computing device, comprising:
   a unibody top case, comprising:
      a side vent system, comprising:

air intakes defined by a downward sloping portion of a sidewall of the unibody top case, the downward sloping portion protruding from an edge of the sidewall; and a bottom case secured within an opening defined by the unibody top case, a peripheral edge of the bottom case being in direct contact with the downward sloping portion of the unibody top case.

16. The portable computing device as recited in claim 15, wherein the portable computing device periodically draws cooling air into the unibody top case through at least one of the air intakes and exhausts the cooling air through cooling vents defined by a rear wall of the unibody top case during operation of the portable computing device.

17. The portable computing device as recited in claim 16, wherein the cooling vents are defined by a central portion of the rear wall and additional cooling vents are defined by each end of the rear wall, and wherein the portable computing device exhausts air through the additional cooling vents.

* * * * *